United States Patent [19]
Rovati et al.

[11] 3,857,938
[45] Dec. 31, 1974

[54] METHOD OF PREPARING A NOVEL ANTACID PHARMACEUTICAL PRODUCT

[75] Inventors: Luigi Rovati; Gianpaolo Picciola; Paolo Senin, all of Milan, Italy

[73] Assignee: Rotta Research Laboratorium S.p.A., Milan, Italy

[22] Filed: Apr. 13, 1973

[21] Appl. No.: 350,866

[30] Foreign Application Priority Data
Apr. 13, 1972   Italy................................. 68139/72

[52] U.S. Cl................................ 424/156, 424/157
[51] Int. Cl............................................. A61k 27/00
[58] Field of Search............................ 424/156, 157

[56] References Cited
UNITED STATES PATENTS
2,880,136   3/1959   Gore................................... 424/156
3,239,416   3/1966   Rubino............................... 424/156
3,272,704   9/1966   Beekman........................... 424/156

FOREIGN PATENTS OR APPLICATIONS
831,719   11/1960   France............................... 424/156
1,185,920   3/1970   Great Britain..................... 424/156
1,236,880   6/1971   Great Britain..................... 424/156

Primary Examiner—Frederick E. Waddell
Attorney, Agent, or Firm—Sughrue, Rothwell, Mion, Zinn & MacPeak

[57] ABSTRACT

Preparing an antacid product by specifically associating aluminum hydroxide and basic Mg carbonate pentahydrate.

7 Claims, 1 Drawing Figure

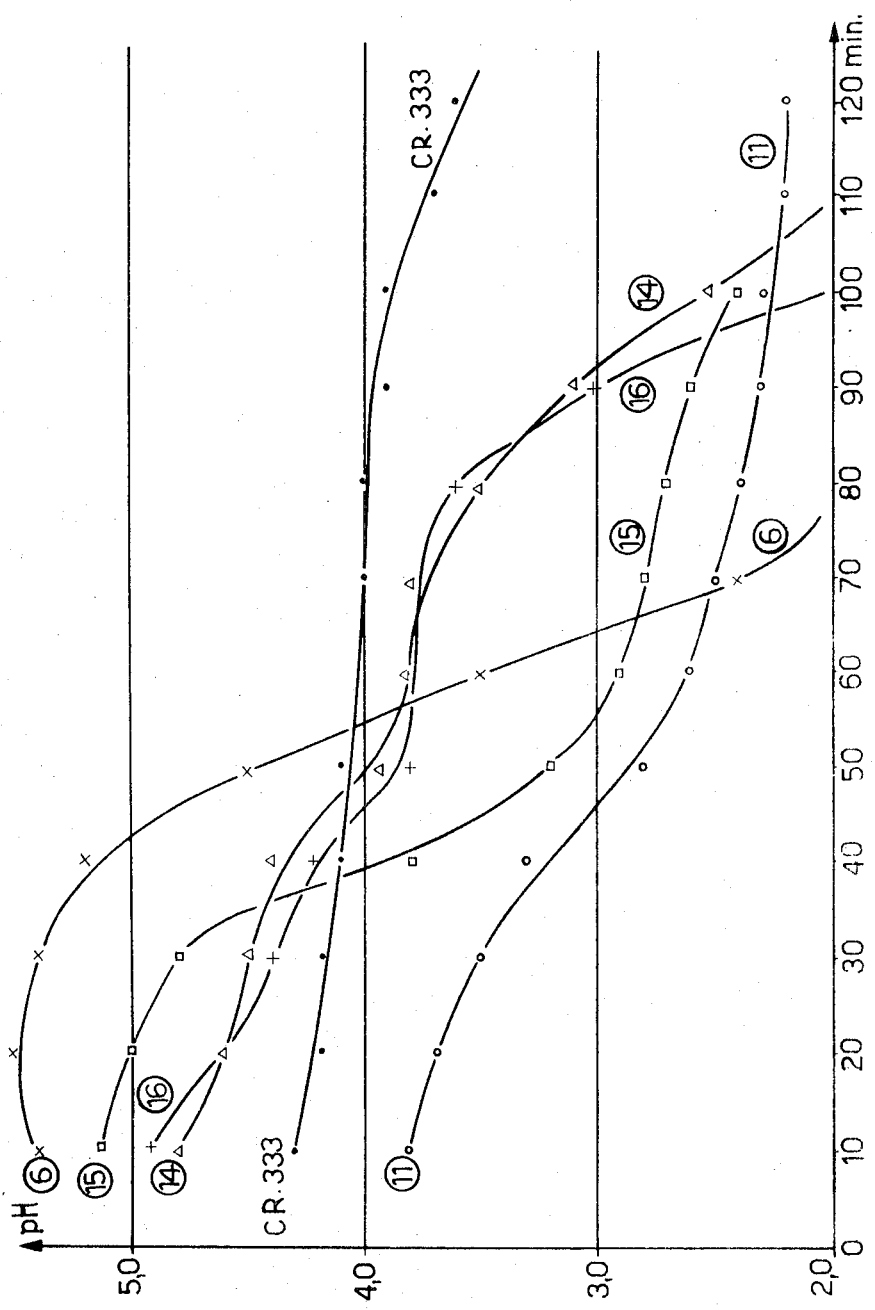

METHOD OF PREPARING A NOVEL ANTACID PHARMACEUTICAL PRODUCT

The present invention relates to pharmaceuticals therapeutically active in treating gastric hyperacidity, gastroduodenitis and peptic ulcer. These substances form the so-called "antacid" group.

It is known that an ideal antacid should meet the following three requirements at least:
1. - high neutralizing activity towards the hydrogen $H^+$ ions;
2. - a buffering power at pH levels compatible with the pepsinic activity (pH not exceeding 5);
3. - avoidance of secretory rebound otherwise known as acid secretory return or reflexed hypersecretion.

The antacids most widely used are sodium bicarbonate, magnesium oxide, aluminum hydroxide and kaolin. However, none of these (or other) presently known antacids, employed alone or jointly, satisfactorily meet the above three requirements. For example, aluminum hydroxide exhibits a fairly good neutralizing power, but its buffering power is effective at extremely low pH levels (between 1 and 2); moreover, it gives rise to a significant secretory rebound. The same considerations apply, though with certain variants, to kaolin which is practically deprived of neutralizing and buffering activity and induces a high secretory rebound. Magnesium oxide is of a rather high neutralizing capacity but gives rise to a high secretory rebound and its buffering power is effective at substantially alkaline pH levels (between 8 and 9). Sodium bicarbonate is of a moderate neutralizing activity, gives rise to a high secretory rebound and its buffering power is practically nil. Among antacids the basic magnesium carbonate pentahydrate is further known, which is of a good neutralizing activity but, similarly to sodium bicarbonate, gives rise to a substantial secretory rebound, its buffer powder being effective at an excessive pH level (between 6 and 7) such as to aggravate digestive derangements (rebound, pepsinic deactivation, etc.) previously referred to.

It has not been found that the above recited requirements 1., 2., and 3., can be met to a highly satisfactory extend by a novel product which results from a special method of preparation. More particularly, it has been found that by specifically associating aluminum hydroxide and basic Mg carbonate pentahydrate surprising results are obtained which could not be anticipated from the properties of either constituent or a mixture of the latter.

The process according to the invention is characterized by the operational steps of:
a. - dissolving in water aluminum sulphate hydrate $Al_2(SO_4)_3 \cdot 18H_2O$ in a proportion of 1,400-4,000 ml water per mole sulphate;
b. adding to the resulting solution while stirring, aqueous ammonia of a 27-30 percent concentration by weight, at a pouring rate of 0.100-0.160 moles/min per mole dissolved sulphate, till a final pH of 9.75-9.81 is obtained, thereby uniformly dispersing the aluminum hydroxide $Al(OH)_3$ in jelly form;
c. - uniformly dispersing in said dispersion basic magnesium carbonate pentahydrate $(MgCO_3)_4 \cdot Mg(OH)_2 \cdot 5H_2O$ in particles not exceeding 50 microns in size, in a quantity corresponding to 1.0 – 1.2 atoms Mg per atom Al present in the dispersion;
d. filtering the dispersion obtained in step (c);
e. - removing from the filtering residue by washing with water most of the ammonium sulphate entrapped therein as byproduct of step (b);
f. - replacing by acetone 60 percent at least by weight of the water impregnating the washed residue;
g. - drying the acetone-impregnated residue at a temperature of 60°-80°C till a solid particulate product conteining less than 1 percent by weight of imbibition water is obtained;
h. - mechanically reducing the product particles to a size not exceeding 10 microns.

The product resulting from the above process essentially consists of amorphous aluminum hydroxide supported on basic magnesium carbonate crystals. However, it would appear from the research work carried out heretofore that the aluminum hydroxide shell is present in a very peculiar form, namely an extremely porous form of high specific area. By operating under optimum conditions, as will be detailed hereafter, the prevailing portion of the product particles comprises tiny grains of basic Mg carbonate wholly enrobed by an amorphous Al hydroxide film.

In actual practice, the individual steps of the process are as follows:

Step (a): This step simply consists in dissolving Al sulphate hydrate in water and is usually carried out at room temperature (18°-25°C). The proportion of water is critical for the purposes of the following steps of the process, more particularly step (c). With water quantities below 1,400 ml per mole sulphate the dispersion obtained in step (b) is so thick that a uniform dispersion of the basic Mg carbonate at step (c) is practically impossible; conversely, with water quantities exceeding 4,000 ml per mole sulphate the basic Mg carbonate particles added at step (c) easily tend to settle so that, though uniform dispersion of the carbonate particles can be easily obtained, it can hardly be maintained so subsequently. Preferably, the water proportion is of from 1,500 to 2,000 ml per mole sulphate. The optimum proportion is about 1,600 ml/mole.

Step (b): The preferred ammonia concentration amounts to about 28 percent corresponding to 26 Be. The step is carried out while stirring in order to uniformly disperse in the aqueous medium the gelatinous hydroxide particles being formed. The pouring rate affects the particle size and should, preferably be of from 0.115 to 0.150 moles/min/mole sulphate, the optimum rate being 0.130 – 0.135 moles/min/mole sulphate. The final pH is preferably 9.79 to 9.81. This results in a substantially thorough Al precipitation as hydroxide. At more alkaline pH values the hydroxide tends to dissolve. Should the above mentioned final pH value be accidentally exceeded, this can be remedied by correcting the effective pH by means of sulphuric acid. The temperature at step (b) preferably amounts to 20° to 25°C; under these conditions, the rate of reaction is optimum and no ammonia losses by evaporation are to be feared. On completion of pouring of ammonia stirring is recommended during further ten minutes.

Step (c); while stirring the dispersion from step (b), the basic Mg carbonate in the form of crystalline powder is slowly poured thereinto. For the sake of an efficient dispersion of the carbonate the pouring rate should be of from 0.008 to 0.013 moles/min per mole sulphate employed at step (a). The preferred rate is 0.009 to 0.012 moles/min/mole sulphate. The basic Mg carbonate pentahydrate is hardly soluble in the dispersion from step (b): at any rate, step (c) shall preferably be carried out at a reasonably low temperature, such as 20°-23°C. Preferably, the carbonate particles are below 15 microns in size, the ideal size being of 5 to 10 microns. The "ideal size" particles mentioned above not only thoroughly disperse in the aluminum from step (b), but also hardly tend to settle so that once uniformity in dispersion is reached, it is easily maintained also during the following steps of the process.

Step (d): In commercial practice filtering on a filterpress is recommended; in laboratory practice filtering is carried out by suction. The filtrate consists of an aqueous solution of ammonium sulphate formed as by-product at step (b). The solid residue shall preferably be in the form of a coherent moist cake.

Step (e): At this step a preponderant proportion of the ammonium sulphate trapped in the above-mentioned cake is removed. To this end the cake is preferably distempered with a small volume of water, preferably not exceeding the volume employed at step (a). A creamy slurry should be obtained. After filtering, preferably on a filterpress or in vacuum, the treatment with water can be repeated once or several times; it will be seen that, by so doing, the swelling degree of the precipitate gradually decreases. It is advisable to pursue washing till the sulphate ions are substantially thoroughly removed. The cake from the final filtering typically contains 70-85 percent by weight moisture and is markedly micro-granular.

Step (f): This is an extremely important step. First of all, as will be more clearly seen from the results of the specific examples given hereafter, the choice of acetone rather than other volatile organic, more or less water-miscible solvents (such as mentanol, ethanol or isopropyl ether) is critical. It is believed that the substantial replacement of the water impregnating the cake by this solvent exerts a "regulating" effect on the physical processes occurring during gelling of the aluminum hydroxide at the next drying step (g). More particularly, it is believed that, when 60 percent at least water impregnating the cake has been replaced by acetone, the contraction in volume of aluminum hydroxide during drying is subdivided into infinitesimal partial contractions of infinitesimal partial volumes of the hydroxide, with the inherent formation of extremely small pores so that each grain of (crystalline) basic magnesium carbonate is enrobed by a sponge of $Al(OH)_3$. At this step also the distempering technique is advantageously employed. For example, by distempering the cake from step (e) in a quantity of acetone amounting to 2-3 times only the weight of the impregnating water, and by moderately stirring to equilibrium (that is, till the liquid phase no longer exhibits a tendency towards depletion in acetone), the certainty is acquired that the solid particles contain less than 40 percent of the water quantity previously impregnating the said particles. Generally, this state of equilibrium is reached with a substantial approximation within 30 minutes. The slurry is thereafter filtered, preferably on a filterpress or centrifuge. If desired, the distempering and filtering treatment can be repeated; however, there is no advantage to repeat this treatment beyond the point at which the liquid impregnating the final cake contains about 10 percent only by weight of water. On practising the invention, it will be seen that the weight of this cake will be approximately three times less the weight of the cake from step (e).

Step (g): The cake from the preceding step (f) is easy to crumble as can then be dried without particular complication, the result being a particulate product. The drying temperature is a highly important factor. The preferred range is 65°-75°C; the optimal value is 70° ± 2°C. Drying is considered to be complicated when the moisture content has sunk below 1 percent by weight, preferably below 0.5 percent by weight. It is understood that the term "moisture content" does not include the crystallization water of the basic magnesium carbonate; in other words drying shall remove the imbibition water but not the crystallization water. For the sake of a uniform result, the cake from step (f) is conveniently spread to a thin layer in accordance with known concepts.

Step (h): This step shall bring the grain size of the product to suitable values for administration to the patient. Preferably, these values shall be of 5 to 10 microns. This is a further reason why the size of the basic Mg carbonate particles employed at step (c) shall advantageously be within the same range. Though various known apparatus can be employed for reducing the size of the product particles to the above-mentioned values, the socalled micronizers are preferably recommended, in which the solid particles disintegrate by mutual collision in a high-speed gas stream in a suitably shaped chamber. By operating under these preferred conditions, the end product essentially comprises crystalline cores of basic Mg carbonate totally or almost totally enrobed by a porous alumina layer.

EXAMPLE 1

555 g (1 mole) $Al_2(SO_4)_3 \cdot 18H_2O$ are dissolved in 1,600 ml water at room temperature while stirring. On completion of dissolution ammonia at 26 Be is drippped into the solution at a rate of 0.133 moles/minute; the total consumption is 6 moles (750 g) in 45 minutes. During dripping the liquid mass is moderately stirred (stirrer speed: 120 rev/min). The final pH is 9.80. The temperature is 20°C. Stirring is pursued during further 15 minutes, whereafter 195 g (0,4 moles) $(MgCO_3)_4 \cdot Mg(OH)_2 \cdot 5H_2O$ in particles below 15 microns are slowly poured while further stirring. The pouring speed is 0.01 moles/min = 4.86 g/min. Pouring is completed after 40 minutes. Stirring is pursued during 20 further minutes, followed by filtering in vaccum. The precipitate is distempered with 1,500 ml water and filtered in vacuum; this treatment is repeated once more. The resulting filter cake contains 1.054 g imbibition water. The cake is then distempered with 2,500 g acetone at 21°C, the resulting slurry being stirred during 30 minutes and filtered in vacuum. On evaporation of the acetone from the filtrate the residue is 994 g water, which implies that almost 90 percent out of the 1,054 g imbibition water have been displaced. At this stage the liquid imbibing the cake comprises 29 percent water and 71 percent acetone. The cake is broken and dried in an oven at 70°C during 15 hours. The powdery product (257 g) is finally micronized to 5-10 micron size.

EXAMPLE 2

The procedure is as in Example 1; however, 311 g basic Mg carbonate are employed.

EXAMPLE 3

The procedure is as in Example 1; however, 272 g basic Mg carbonate are employed.

EXAMPLE 4

The procedure is as in Example 1; however, 155 g basic Mg carbonate are employed.

EXAMPLE 5

The procedure is as in Example 1; however, 117 g basic Mg carbonate are employed.

EXAMPLE 6

156 g Al(OH)$_3$ less than 10 microns in size are mechanically mixed with 195 g crystalline basic Mg carbonate 5–10 microns in size.

EXAMPLE 7

The procedure is as in Examaple 1; however, the Al hydroxide precipitation final pH value amounts to 9.5.

EXAMPLE 8

The procedure is as in Example 1; however, the Al hydroxide precipitation final pH value amounts to 8.0.

EXAMPLE 9

The procedure is as in Example 1; however, the Al hydroxide precipitation final pH value amounts to 9.0.

EXAMPLE 10

The procedure is as in Example 1; however, the Al hydroxide precipitation final pH value amounts to 10.5.

EXAMPLE 11

The procedure is as in Example 1; however, water is not replaced by acetone.

EXAMPLE 12

The procedure is as in Example 1; however, drying is carried out at 100°C.

EXAMPLE 13

The procedure is as in Example 1; howver, drying is carried out at 50°C.

EXAMPLE 14

The procedure is as in Example 1; however ethanol is employed instead of acetone.

EXAMPLE 15

The procedure is as in Example 1; however, isopropyl ether is employed instead of acetone.

EXAMPLE 16

The procedure is as in Example 1; howver methanol is employed instead of acetone.

Summarizing Table

| Example | Mg/Al atom ratio | pH | Solvent | Drying Temperature °C |
|---|---|---|---|---|
| 1 | 1 : 1 | 9.8 | Acetone | 70 |
| 2 | 1.6 : 1 | 9.8 | do. | 70 |
| 3 | 1.4 : 1 | 9.8 | do. | 70 |
| 4 | 0.8 : 1 | 9.8 | do. | 70 |
| 5 | 0.6 : 1 | 9.8 | do. | 70 |
| 6 | 1 : 1 | | mechanical mixture | |
| 7 | 1 : 1 | 9.5 | Acetone | 70 |
| 8 | 1 : 1 | 8.0 | do. | 70 |
| 9 | 1 : 1 | 9.0 | do. | 70 |
| 10 | 1 : 1 | 10.5 | do. | 70 |
| 11 | 1 : 1 | 9.8 | Water | 70 |
| 12 | 1 : 1 | 9.8 | Acetone | 100 |
| 13 | 1 : 1 | 9.8 | do. | 50 |
| 14 | 1 : 1 | 9.8 | Ethanol | 70 |
| 15 | 1 : 1 | 9.8 | Isopropyl ether | 70 |
| 16 | 1 : 1 | 9.8 | Methanol | 70 |

The product from Example 1 shall be briefly referred to hereafter as CR.333.

In the following Table 1 the neutralizing power of CR.333 is compared with those of certain other antacids. The neutralizing power is represented by the quantity of N/10 hydrochloric acid (expressed in mEq H$^+$) required for bringing to pH = 3.5 a solution of dispersion of 1 g antacid in 100 ml water.

TABLE 1

| Antacid | Neutralizing power expressed in mEq H$^+$ |
|---|---|
| CR.333 | 27.7 |
| Sodium bicarbonate | 12.1 |
| Magnesium oxide | 42.5 |
| Basic magnesium carbonate | 19.5 |
| Aluminum hydroxide | 8.5 |
| Kaolin | 0.3 |

The table shows that, with the exception of MgO (which however is objectional in that it brings the gastric juice to an alkaline pH) CR.333 exhibits the highest neutralizing power for hydrogen ions.

In order to determine the buffering power the test of Holbert, Noble and Grote - J. Am. Pharm. Assoc. 36, 149 (1947) and 37, 292 (1948) - modified by Robert S. Murphey - J. Am. Pharm. Assoc. 41, 361 (1952), was employed. This test makes use of the so-called artificial stomach essentially comprising a glass ampoule 250 ml in volume, of cylindrical shape, rotated at a constant speed of 4 rev/min. The ampoule is charged with 180 ml artificial gastric juice composed along the following formula:

| | |
|---|---|
| concentrated HCl (density 1.19) | 7 ml |
| Pepsin (dilution 1:3000) | 3.2 g |
| NaCl | 2 g |
| H$_2$O to make | 1,000 ml |

1.8 g of the antacid being tested is introduced into this artificial gastric juice. The test is carried out over 120 minutes. At intervals of 10 minutes 18 ml liquid are withdrawn and as many ml fresh gastric juice are introduced. Directly thereafter the pH value of the liquid in the ampoule is measured. The sequence of the pH values determined as above gives a picture of the neutralizing and buffer characteristics of the substance being tested. The following Table 2 shows the buffering power of the substances obtained in 1–16.

TABLE 2

| TIME minutes | pH EXAMPLE n° | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 0 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| 10 | 4.3 | 5.6 | 5.5 | 5.4 | 5.2 | 5.4 | 4.1 | 4.2 | 3.9 | 3.8 | 3.8 | 3.6 | 5.4 | 4.8 | 5.1 | 4.9 |
| 20 | 4.2 | 5.7 | 5.5 | 5.5 | 5.2 | 5.5 | 4.1 | 4.0 | 3.9 | 3.6 | 3.7 | 3.6 | 5.3 | 4.6 | 5.0 | 4.6 |
| 30 | 4.2 | 5.6 | 5.4 | 5.2 | 4.9 | 5.4 | 3.9 | 3.4 | 3.4 | 3.0 | 3.5 | 3.3 | 5.1 | 4.5 | 4.8 | 4.4 |
| 40 | 4.1 | 5.4 | 5.1 | 4.9 | 4.3 | 5.2 | 3.7 | 2.9 | 3.4 | 2.6 | 3.3 | 3.2 | 3.6 | 4.4 | 3.8 | 4.2 |
| 50 | 4.1 | 5.1 | 4.6 | 3.7 | 3.0 | 4.5 | 3.5 | 2.6 | 2.7 | 2.2 | 2.8 | 2.9 | 3.4 | 3.9 | 3.2 | 3.8 |
| 60 | 4.0 | 4.5 | 4.0 | 2.8 | 2.2 | 3.5 | 3.3 | 2.4 | 2.7 | 1.8 | 2.6 | 2.8 | 3.3 | 3.8 | 2.9 | 3.8 |
| 70 | 4.0 | 2.9 | 2.9 | 2.0 | 2.0 | 2.4 | 3.0 | 2.2 | 2.5 | 1.7 | 2.5 | 2.8 | 2.9 | 3.8 | 2.8 | 3.8 |
| 80 | 4.0 | 2.1 | 2.1 | 2.9 | 1.8 | 2.0 | 2.9 | 2.1 | 2.5 | 1.7 | 2.4 | 2.6 | 2.8 | 3.5 | 2.7 | 3.6 |
| 90 | 3.9 | 1.9 | 1.8 | 1.8 | 1.7 | 2.0 | 2.5 | 2.0 | 2.3 | 1.6 | 2.3 | 2.5 | 2.6 | 3.1 | 2.6 | 3.0 |
| 100 | 3.9 | 1.8 | 1.7 | 1.8 | 1.7 | 1.8 | 2.3 | 1.9 | 2.2 | 1.6 | 2.3 | 2.5 | 2.5 | 2.5 | 2.4 | 2.0 |
| 110 | 3.7 | 1.8 | 1.6 | 1.7 | 1.6 | 1.6 | 2.2 | 1.8 | 2.2 | 1.6 | 2.1 | 2.5 | 2.5 | 1.8 | 2.2 | 1.7 |
| 120 | 3.6 | 1.7 | 1.6 | 1.6 | 1.6 | 1.6 | 2.0 | 1.8 | 2.1 | 1.5 | 2.1 | 2.4 | 2.3 | 1.5 | 2.2 | 1.6 |

Table 2 shows that the product of Example 1 (CR.333) keeps the pH value in the desired range throughout the 120 minutes of the test period. It moreover shows that the products of Examples 2–5 in which the Mg/Al atom ratio is beyond the range of the invention, behave more or less like the product of Example 6 (a mere mixture of the two constituents) producing a high initial pH value (over 5) which sinks below 3 within 50–70 minutes. The products of Examples 7–10, obtained with pH values beyond the limits claimed therein, provide initial acid levels which are satisfactory enough, but maintain them during a short time only (40–70 minutes). The same remark applies to the product of Example 11, which has been obtained without substituting acetone for water. The product of Example 12 obtained by drying at 100°C provides a high pH (5.4–5.1) over the first 30 minutes, which however sinks below 3.0 during the following 30 minutes. The product of Example 13, dried at 50°C only, already initially provides a Ph value below 4, its buffering power at this level lasting 40 minutes only. The products of Examples 14 and 16, obtained by displacing water by ethanol and methanol, respectively, equal CR.333 during the first 60–70 minutes only; the product of Example 15 obtained by displacing water by isopropyl ether behaves still worse.

Comparison of CR.333 and certain particularly significant products tabulated in Table 2 becomes more striking on considering the accompanying drawing, which is a diagram showing the pH values as functions of time. The favourable progress of the curve relating to CR.333 is evident.

In Table 3 the buffering power of CR.333 is compared with that of the other antacids previously considered in Table 1.

TABLE 3

| Time (minutes) | CR.333 | Sodium bicarbonate | Magnesium Oxide | Kaolin | Aluminum hydroxide | Basic Magnesium carbonate |
|---|---|---|---|---|---|---|
| 0 | 1.2 | 1.2 | 1.2 | 1.2 | 1.2 | 1.2 |
| 10 | 4.3 | 6.0 | 9.0 | 1.3 | 1.3 | 6.15 |
| 20 | 4.2 | 6.1 | 8.8 | 1.3 | 1.2 | 6.5 |
| 30 | 4.2 | 5.7 | 8.8 | 1.3 | 1.7 | 6.55 |
| 40 | 4.1 | 4.5 | 8.8 | 1.3 | 1.7 | 6.30 |
| 50 | 4.1 | 2.5 | 8.8 | 1.3 | 1.8 | 6.20 |
| 60 | 4.0 | 1.9 | 8.7 | 1.3 | 1.8 | 6.0 |
| 70 | 4.0 | 1.6 | 8.7 | 1.3 | 1.7 | 5.85 |
| 80 | 4.0 | 1.5 | 8.7 | 1.3 | 1.7 | 5.65 |
| 90 | 3.9 | 1.4 | 8.6 | 1.4 | 1.7 | 5.25 |
| 100 | 3.9 | 1.3 | 8.3 | 1.4 | 1.7 | 3.40 |
| 110 | 3.7 | 1.3 | 8.1 | 1.4 | 1.6 | 2.0 |
| 120 | 3.7 | 1.28 | 8.0 | 1.4 | 1.6 | 1.7 |

Tables 2 and 3 clearly show the CR.333 stabilizes gastric pH during a long time between about 3.5 and about 4.5, these values reducing hyperacidity but not deactivating the pepsinic digestive processes. None of the further substances considered herein provide this effect.

As to the secretory rebound, systematic tests were carried out by the double antral and stomach body pouch (R.A. Gregory - Secretory Mechanisms of the Gastro-Intestinal Tract - page 38 Edward Arnold Publishers Ltd., London). Without going into every detail, the above method broadly consists in forming in the stomach of a dog two pouches, namely an antral pouch and a stomach bottom pouch, which do not communicate with each other. Given quantities of the substance to be tested are introduced into the antral pouch, sensitive to stimuli, while the gastric juice is collected from the pouch having a secretory attitude, the emission of the said juice having been caused by the substance being tested. In the present case, CR.333 and the comparative substances were introduced in the form of an aqueous suspension, in the standard quantity of 2g in 20 ml water. At 15 minutes intervals (during three hours in all) the substance was removed from the respective pouch and replaced by an identical quantity of fresh substance in order to make the stimulus more continuous. Evaluation of the effects was made by measuring the quantity and pH of the gastric juice issuing from the other pouch. The results are given in the following Table 4.

We claim:
1. A method of preparing a novel antacid pharma-

TABLE 4

| | | 1 | 2 | 3 | 4 | 5 | 6 | 7 | 8 | 9 |
|---|---|---|---|---|---|---|---|---|---|---|
| Withdrawal | Time min. | CR.333 | Sodium bi-carbonate | Magnesium oxide | Kaolin | Aluminum hydroxide | Chlorine solution | Nil | Physiological salt solution | Basic carbonate |
| 01 | R | 2.40 | 2.6 | 4.00 | 1.85 | 1.34 | 0.80 | 2.92 | 0 | 1.6 |
| 1 | 15 | 0.60 | 1.5 | 4.07 | 1.90 | 0.92 | 0.77 | 0.85 | 0.52 | 1.8 |
| 2 | 30 | 0.82 | 3.8 | 4.50 | 0.70 | 0.58 | 0.97 | 0.92 | 0.65 | 3.6 |
| 3 | 45 | 0.94 | 1.1 | 6.42 | 1.40 | 0.76 | 1.67 | 0.50 | 0.75 | 3.2 |
| 4 | 60 | 1.12 | 0.4 | 2.00 | 2.25 | 1.25 | 2.97 | 0.02 | 0.45 | 3.9 |
| 5 | 75 | 0.35 | 0.4 | 2.60 | 4.12 | 1.70 | 3.18 | 0.10 | 0.35 | 3.4 |
| 6 | 90 | 1.03 | 1.5 | 4.12 | 0.97 | 1.96 | 4.31 | 0.20 | 0.22 | 2.6 |
| 7 | 105 | 0.97 | 1.9 | 5.02 | 5.25 | 2.10 | 4.57 | 1.02 | 1.07 | 1.8 |
| 8 | 120 | 0.82 | 2.4 | 4.52 | 8.15 | 1.8 | 4.63 | 0.72 | 0.9 | 2.9 |
| 9 | 135 | 0.27 | 2.4 | 3.22 | 6.82 | 0.72 | 4.37 | 1.07 | 1.2 | 1.7 |
| 10 | 150 | 0.85 | 6.8 | 5.72 | 1.55 | 1.30 | 5.21 | 0.25 | 0.5 | 2.6 |
| 11 | 165 | 0.62 | 0.7 | 2.80 | 4.40 | 1.28 | 4.16 | 0.22 | 1.0 | 2.0 |
| 12 | 180 | 0.60 | 2.7 | 4.25 | 0.00 | 1.42 | 3.35 | 0.15 | 0.25 | 2.4 |
| Average | | 0.75 | 2.13 | 4.10 | 3.12 | 1.31 | 3.35 | 0.50 | 0.65 | 2.66 |
| Confid. limits | | 0.59 | (1.0 | (3.28 | (1.48) | 0.99 | 2.4 | 0.26 | 0.46 | 2.18 |
| | | 0.90 | 3.26) | 4.9) | | 1.63 | 4.3 | 0.74 | 0.85 | 3.14 |

1/5 t  3.472
1/7 t  1.850
3/6 t  1.335
5/7 t  4.472
1/9 t  2.23.

The numerical data given in Table 4 express the mEqH$^+$ secreted at the 15 minutes intervals tabulated in the second column. By taking for comparison purposes columns 7 and 8 it will be obvious that among the test substances CR.333 is the only product which does not practically cause any secretory stimulus. It will be further seen from Table 4 that the values given in the CR.333 column strikingly differ from those distinguishing aluminum hydroxide and basic magnesium carbonate.

The advantages of CR.333 previously set out were further confirmed by a clinical tests on 52 gastroduodenopatic subjects, 45 our of whom were treated with tablets containing 500 out mg CR.333 while 7 were treated with a suspension containing 6 g CR.333 in 100 ml. The respective compositions were formulated as follows:

| Tablets: | CR.333 | 500 mg |
|---|---|---|
| | Mannitol | 150 do. |
| | Lactose | 50 do. |
| | Sugar | 80 do. |
| | Carbowax 6000 | 30 do. |
| | Syloid 244 | 8 do. |
| | Talcum | 32 do. |
| | Magnesium stearate | 8 do. |
| | All-fruit aroma powder 2.5 mg | |
| Suspension: | 100 ml suspension contain: | |
| | CR.333 | 6.000 g |
| | Mannitol | 6.000 g |
| | Propyl p-oxybenzolate | 0.010 g |
| | Methyl p-oxybenzoate | 0.060 g |
| | Adragant | 0.800 g |
| | 70% Sorbitol | 39.000 g |
| | Distilled water to make 100 ml | |

Generally, the tablets can contain, for example, 200 to 1,000 mg CR.333. The above described clinical treatment disclosed both the absence of the reflected hypersecretion and the reduction (even disappearance) of gastroduodenitic symptomatology. Pyrosis, intensity of spontaneous pain, intensity of stimulated pain, pain rhythm, vomit, nausea and neuropsychial disturbances, which are the typical symptoms of gastroduodenopathies, were taken as parameters.

ceutical product for oral use characterised by the operational steps of:

a. dissolving in water aluminum sulphate hydrate Al$_2$(SO$_4$)$_3$.18H$_2$O in a proportion of 1,400 – 4,000 ml water per mole sulphate;

b. adding to the resulting solution while stirring aqueous ammonia of a 27–30 percent by weight concentration at a pouring rate of 0.100–0.160 moles/min per mole dissolved sulphate, till a final pH of 9.75–9.81 is reached, thereby uniformly dispersing aluminum hydroxide Al(OH)$_3$ in gelatinous form;

c. uniformly dispersing in the said dispersion basic magnesium carbonate pentahydrate (MgCO$_3$)$_4$.Mg(OH)$_2$.5H$_2$O in particles not exceeding 50 microns in size, in a quantity corresponding to 1.0–1.2 atoms Mg to one atom Al present in the dispersion;

d. filtering the dispersion from step (c);

e. removing from the filtering residue by washing with water a preponderant proportion of the ammonium sulphate trapped therein as a by-product of step (b);

f. replacing by acetone at least 60 percent by weight of the water impregnating the washed residue;

g. drying the acetone-impregnated residue at a temperature of 60°–80°C to obtain a solid particulate product containing less than 1 percent by weight imbibition water;

h. mechanically reducing the product particles to a size not exceeding 10 microns.

2. The method of claim 1, wherein the water proportion at step (a) is 1,500–2,000 ml per mole sulphate.

3. The method of claim 1 wherein the aqueous ammonia employed at step (b) is at 26 Be.

4. The method of claim 1, wherein the final pH value at step (b) is 9.79 to 9.81.

5. The method of claim 1, wherein the size of the particles of the basic magnesium carbonate at step (c) does not exceed 15 microns.

6. The method of claim 1, wherein replacement by acetone is effected by distempering the product from step (e) with an acetone quantity equalling 2 times at least by weight the water impregnating the product and thereafter removing the excess aqueous acetone.

7. An antacid for oral use obtained by the method comprising the steps of:
   a. dissolving in water aluminum sulphate hydrate $Al_2(SO_4)_3..18H_2O$ in a proportion of 1,400 – 4,000 ml water per mole sulphate;
   b. adding to the resulting solution while stirring aqueous ammonia of a 27–30 percent by weight concentration at a pouring rate of 0.100–0.160 moles/min per mole dissolved sulphate, till a final pH of 9.75–9.81 is reached, thereby uniformly dispersing aluminum hydroxide $Al(OH)_3$ in a gelatinous form;
   c. uniformly dispersing in the said dispersion basic magnesium carbonate pentahydrate $(MgCO_3)_4.Mg(OH)_2. 5H_2O$ in particles not exceeding 50 microns in size, in a quantity corresponding to 1.0–1.2 atoms Mg to one atom Al present in the dispersion;
   d. filtering the dispersion from step (c);
   e. removing from the filtering residue by washing with water a preponderant proportion of the ammonium sulphate trapped therein as a by-product of step (b);
   f. replacing by acetone at least 60 percent by weight of the water impregnating the washed residue;
   g. drying the acetone-impregnated residue at a temperature of 60°–80°C to obtain a solid particulate product containing less than 1 percent by weight imbibition water;
   h. mechanically reducing the product particles to a size not exceeding 10 microns.

* * * * *